(12) United States Patent
Wallrabe et al.

(10) Patent No.: US 11,760,289 B2
(45) Date of Patent: Sep. 19, 2023

(54) REAR MODULE

(71) Applicant: Dr. Ing. h.c. F. Porsche Aktiengesellschaft, Stuttgart (DE)

(72) Inventors: Sven Wallrabe, Leonberg (DE); James Horn, Sindelfingen (DE); Daniel Rosenauer, Waeschenbeuren (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 120 days.

(21) Appl. No.: 17/348,827

(22) Filed: Jun. 16, 2021

(65) Prior Publication Data
US 2021/0402941 A1   Dec. 30, 2021

(30) Foreign Application Priority Data
Jun. 24, 2020  (DE) ..................... 10 2020 116 559.5

(51) Int. Cl.
| | | |
|---|---|---|
| *B60R 19/50* | (2006.01) | |
| *B60R 19/18* | (2006.01) | |
| *B60R 19/02* | (2006.01) | |
| *B60R 11/04* | (2006.01) | |
| *B60R 13/10* | (2006.01) | |
| *B60R 11/00* | (2006.01) | |

(52) U.S. Cl.
CPC .............. *B60R 19/50* (2013.01); *B60R 11/04* (2013.01); *B60R 13/105* (2013.01); *B60R 19/023* (2013.01); *B60R 19/18* (2013.01); *B60R 2011/004* (2013.01); *B60R 2300/8066* (2013.01)

(58) Field of Classification Search
CPC ....... B60R 19/50; B60R 19/18; B60R 19/023; B60R 13/105; B60R 11/04; B60R 2300/8066; B60R 2011/004
See application file for complete search history.

(56) References Cited

U.S. PATENT DOCUMENTS

| | | | |
|---|---|---|---|
| 8,308,206 B2 | 11/2012 | Kunz et al. | |
| 2020/0247476 A1* | 8/2020 | Ritz ........................ | B60R 11/04 |

FOREIGN PATENT DOCUMENTS

| | | |
|---|---|---|
| DE | 102007026490 A1 | 12/2008 |
| DE | 102013020664 A1 | 8/2014 |
| DE | 102017010947 A1 | 5/2018 |
| DE | 102017116291 A1 | 1/2019 |
| DE | 102019125674 A1 | 3/2021 |
| JP | 2019171958 A | 10/2019 |

* cited by examiner

*Primary Examiner* — Dennis H Pedder
*Assistant Examiner* — Melissa Ann Bonifazi
(74) *Attorney, Agent, or Firm* — LEYDIG, VOIT & MAYER, LTD.

(57) ABSTRACT

A rear module for a vehicle includes a crossmember that extends along a transverse direction and is connected to the vehicle body and a bumper connected to the crossmember. The bumper includes an aperture. The rear module further includes a reversing camera that protrudes through the bumper, and a first impact element and a second impact element arranged on the bumper to a respective first side and a respective second side of the reversing camera and at a lateral spacing, in the transverse direction, from the reversing camera. The first impact element and the second impact element protrude, in the longitudinal direction, beyond the reversing camera and/or the bumper.

13 Claims, 3 Drawing Sheets

Section A - A:

Section A - A:

REAR MODULE

CROSS REFERENCE TO RELATED APPLICATIONS

This application claims benefit to German Patent Application No. DE 10 2020 116 559.5, filed on Jun. 24, 2020, which is hereby incorporated by reference herein.

FIELD

The invention relates to a rear module for a vehicle and to a vehicle with a rear module.

BACKGROUND

DE 10 2017 010 947 A1 discloses a rear arrangement, in the case of which an impact element with high impact hardness which is supported directly on the bumper bending carrier is configured to absorb any impact loads. In this way, the rear arrangement overall is to be protected. Protection of electronic components which are arranged on the rear arrangement is not provided.

DE 10 2007 026 490 A1 discloses a rear crash element with a plastic part which is placed onto the crossmember. A deformable element is placed onto the front side of the bumper covering, in a flush manner with respect to the plastic part, and is concealed by way of a horn trim panel. The actual plastic part is adjacent via a gap over a large surface area with respect to the inner side of the trim panel. Protection of electronic components of the rear crash element is not provided.

SUMMARY

In an embodiment, the present disclosure provides a rear module for a vehicle. The rear module including a crossmember that extends along a transverse direction and is connected to the vehicle body and a bumper connected to the crossmember. The bumper includes an aperture. The rear module further includes a reversing camera that protrudes through the bumper, and a first impact element and a second impact element arranged on the bumper to a respective first side and a respective second side of the reversing camera and at a lateral spacing, in the transverse direction, from the reversing camera. The first impact element and the second impact element protrude, in the longitudinal direction, beyond the reversing camera and/or the bumper.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
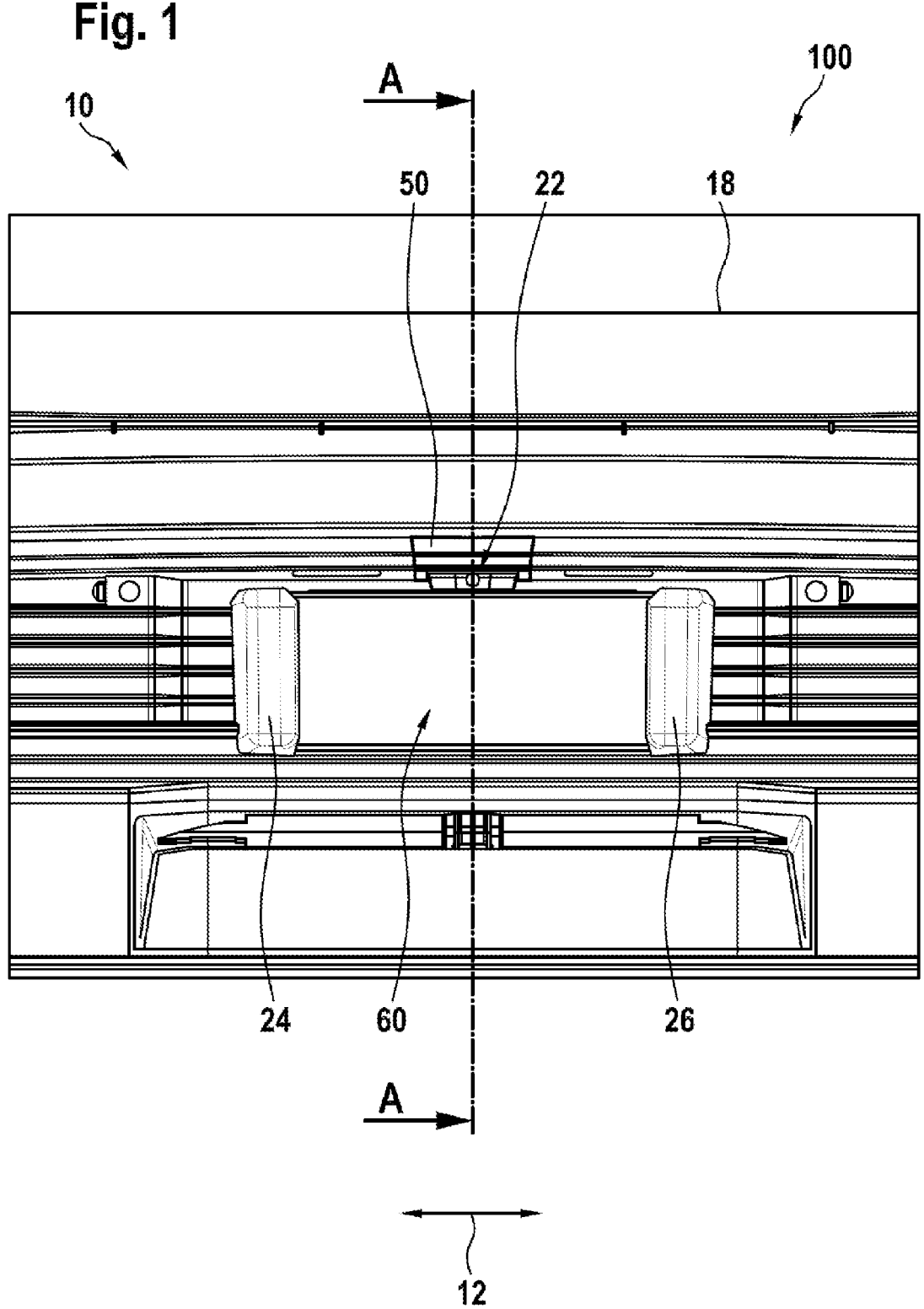
FIG. 1 diagrammatically shows a detail of a rear module of a vehicle.

The present disclosure provides an improved rear module.

The rear module has a crossmember which extends along a transverse direction and is connected to the vehicle body, and a bumper which is connected (indirectly or directly) to the crossmember. The bumper has an aperture, through which a reversing camera protrudes (at least partially). In addition, in each case one impact element is arranged on and/or fastened to the bumper (on both sides) along the transverse direction at a lateral spacing from the reversing camera. The impact elements protrude in the longitudinal direction (toward the rear) beyond the reversing camera and/or the bumper.

A "survival space" for the camera is formed by the impact elements protruding in the longitudinal direction. In this way, damage of the reversing camera can be largely avoided in the case of deformations of the rear module which can occur, for example, in the case of collisions and do not exceed a certain extent. The energy of the impact and/or the collision is absorbed by way of the impact elements. A situation can be achieved where the orientation of the reversing camera does not change or changes merely slightly. This benefits safety and the complexity of repairs.

The rear module serves for a vehicle, in particular for a rear part of a vehicle. The vehicle is, in particular, a motor vehicle, for example a passenger car.

The impact elements are set up and intended to absorb collision energy. The impact elements can be of elastic and/or deformable configuration. Specifically, the impact elements can have an elastic core, for example a foam core such as EPP foam (expanded polypropylene). The impact elements can optionally be trimmed by means of a trim panel, for example with a plastic layer.

Directional indications relate to a coordinate system of the vehicle, which coordinate system consists substantially of three directional indications. These include a driving direction or longitudinal direction (x-axis), a transverse direction (y-axis) and a vertical direction (z-axis).

The reversing camera can preferably be fastened to the vehicle body by means of a camera holder independently of the bumper and/or independently of the crossmember. A deformation of the bumper and/or the crossmember therefore has no effect or merely insignificantly small effects on the reversing camera (maintenance to a large extent of the position and/or the orientation). This benefits safety and complexity of repairs. The camera holder can have a (for example, sleeve-shaped) camera holding section, in which the actual camera module is seated, and one or more base sections which extend away therefrom and via which the camera holder is connected to the vehicle body.

The reversing camera can preferably be fastened to a further body element which differs from the crossmember and extends along the transverse direction of the vehicle body. This also benefits safety and complexity of repairs. The body element can be offset inward relative to the crossmember, that is to say in the longitudinal direction of the vehicle toward the vehicle center and/or or toward the front part of the vehicle. This once again reduces the influences on the reversing camera in the case of deformation of the crossmember and/or the bumper.

The reversing camera can preferably be covered by means of a (separate) covering panel, the covering panel concealing the aperture for the reversing camera, which aperture is configured on the bumper. In this way, the aperture is closed by way of the covering panel. This protects the reversing camera against environmental influences. In addition, a penetration of foreign bodies is largely avoided at the aperture. The covering panel can be placed onto the reversing camera (for example, the camera holding section). The covering panel can be of transparent configuration at least in the field of view of the reversing camera, or an orifice can be configured in the field of view of the camera (that is to say, in the region of the camera lens).

The covering panel can preferably be fastened to the reversing camera (for example, to the camera holding section) by way of a non-positive and/or positively locking engagement. This contributes to simple assembly of the rear module. The covering panel can therefore be placed onto the reversing camera (for example, onto the camera holding section).

The covering panel preferably protrudes beyond the edge of the aperture but does not engage behind the edge of the aperture in the process (undercut-free or "overlapping" configuration). In this way, the covering panel does not engage behind the bumper toward the inside (that is to say, toward the vehicle center). A movement or deformation of the bumper therefore has no influence or merely a negligible influence on the covering panel. This in turn reduces the influences on the reversing camera.

The bumper can advantageously have a license plate mounting region, and the aperture can be configured adjacently with respect to the license plate mounting region. In this way, an arrangement which is favorable in terms of manufacturing and for the camera perspective can be achieved. The license plate mounting region can be configured as a license plate receptacle, for example as a license plate recess.

The impact elements can preferably be arranged in such a way that in each case one impact element is arranged at or adjacently with respect to the lateral (in the transverse direction) ends of the license plate mounting region. This also contributes to a favorable arrangement of the impact elements, the reversing camera and the covering panel.

The object mentioned at the outset is also achieved by way of a vehicle with a rear module of this type. With regard to the advantages which can be achieved by way of this, reference is to be made to the comments in this regard with respect to the rear module. The vehicle can be a motor vehicle, for example a passenger car. The measures which are described in conjunction with the rear module can serve for the further configuration of the vehicle.

FIG. 1 diagrammatically shows a rear part of a vehicle 100, to be precise with a view of a detail of its rear module 10. In said view, a bumper 18, reversing camera 22, impact elements 24, 26, a covering panel 50 and a license plate mounting region 60 can be seen.

Figure 2:
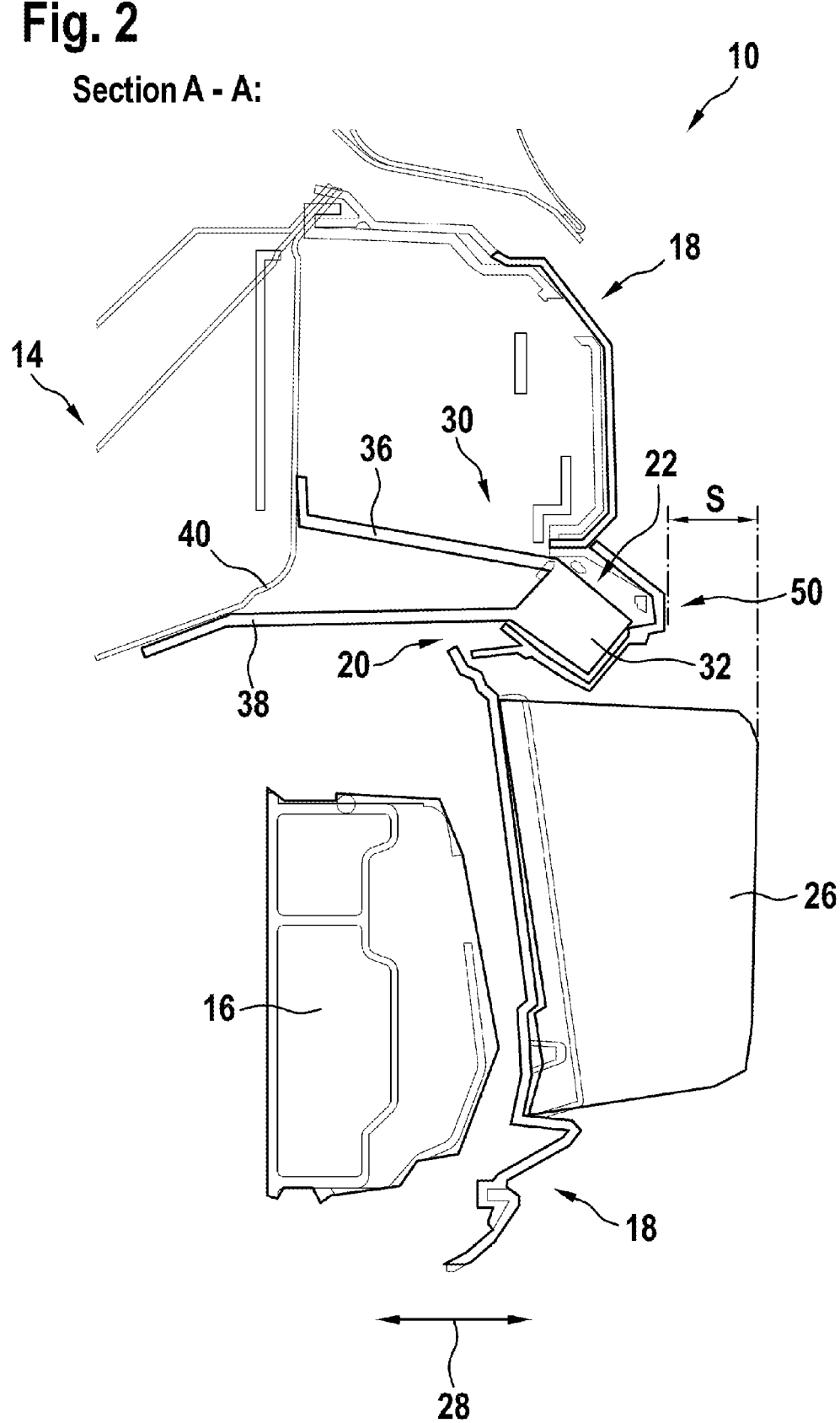
FIG. 2 diagrammatically shows a sectional view (sectional axis A-A in FIG. 1) in a non-deformed state.

FIG. 2 illustrates the construction of the rear module 10 in more detail. The rear module 10 has a crossmember 16 which extends along a transverse direction 12 and is connected to the vehicle body 14, and a bumper 18 which is connected (indirectly or directly) to the crossmember 16.

The bumper 18 has an aperture 20, through which a reversing camera 22 protrudes (at least partially). In addition, in each case one impact element 24, 26 is arranged on and fastened to the bumper 18 (on both sides) along the transverse direction 12 at a lateral spacing from the reversing camera 22 (cf. FIG. 1). The impact elements 24, 26 protrude in the longitudinal direction 28 (toward the rear) beyond the reversing camera 22 and/or the bumper 18 (projection S; cf. FIG. 2).

The reversing camera 22 is fastened to the vehicle body 14 by means of a camera holder 30 independently of the bumper 18 and/or independently of the crossmember 16 (cf. FIG. 2). The camera holder 30 has a (for example, sleeve-shaped) camera holding section 32, in which the actual camera module is seated, and a plurality of base sections 36, 38 which extend away therefrom and via which the camera holder 30 is connected to the vehicle body 14.

The reversing camera 22 is fastened to a further body element 40 which differs from the crossmember 16 and extends along the transverse direction 12 of the vehicle body 14. The body element 40 is offset inward relative to the crossmember 16, that is to say in the longitudinal direction 28 of the vehicle toward the vehicle center or toward the front part of the vehicle.

The reversing camera 22 is covered by means of a separate covering panel 50, the covering panel 50 concealing the aperture 20 for the reversing camera 22, which aperture 20 is configured on the bumper 18 (cf. FIGS. 1 and 2). The covering panel 50 is placed onto the reversing camera 22 or the camera holding section 32. The covering panel 50 can be of transparent configuration or can be configured with an orifice (not shown) at least in the field of view of the reversing camera 22.

The covering panel 50 can be fastened to the reversing camera 22, for example to the camera holding section 32, by way of a non-positive and/or positive engagement.

The covering panel 50 protrudes beyond the edge of the aperture 20, but in the process does not engage behind the edge of the aperture 20. Therefore, the covering panel 50 does not engage behind the bumper 18 toward the inside (that is to say, toward the vehicle center).

The bumper 18 has a license plate mounting region 60, and the aperture 20 is configured so as to be adjacent with respect to the license plate mounting region 60 (cf. FIG. 1). The license plate mounting region 60 can be configured, for example, as a license plate recess.

The impact elements 24, 26 are arranged in such a way that in each case one impact element 24, 26 is arranged at or in an adjoining manner with respect to the lateral (in the transverse direction) ends of the license plate mounting region 60.

Figure 3:
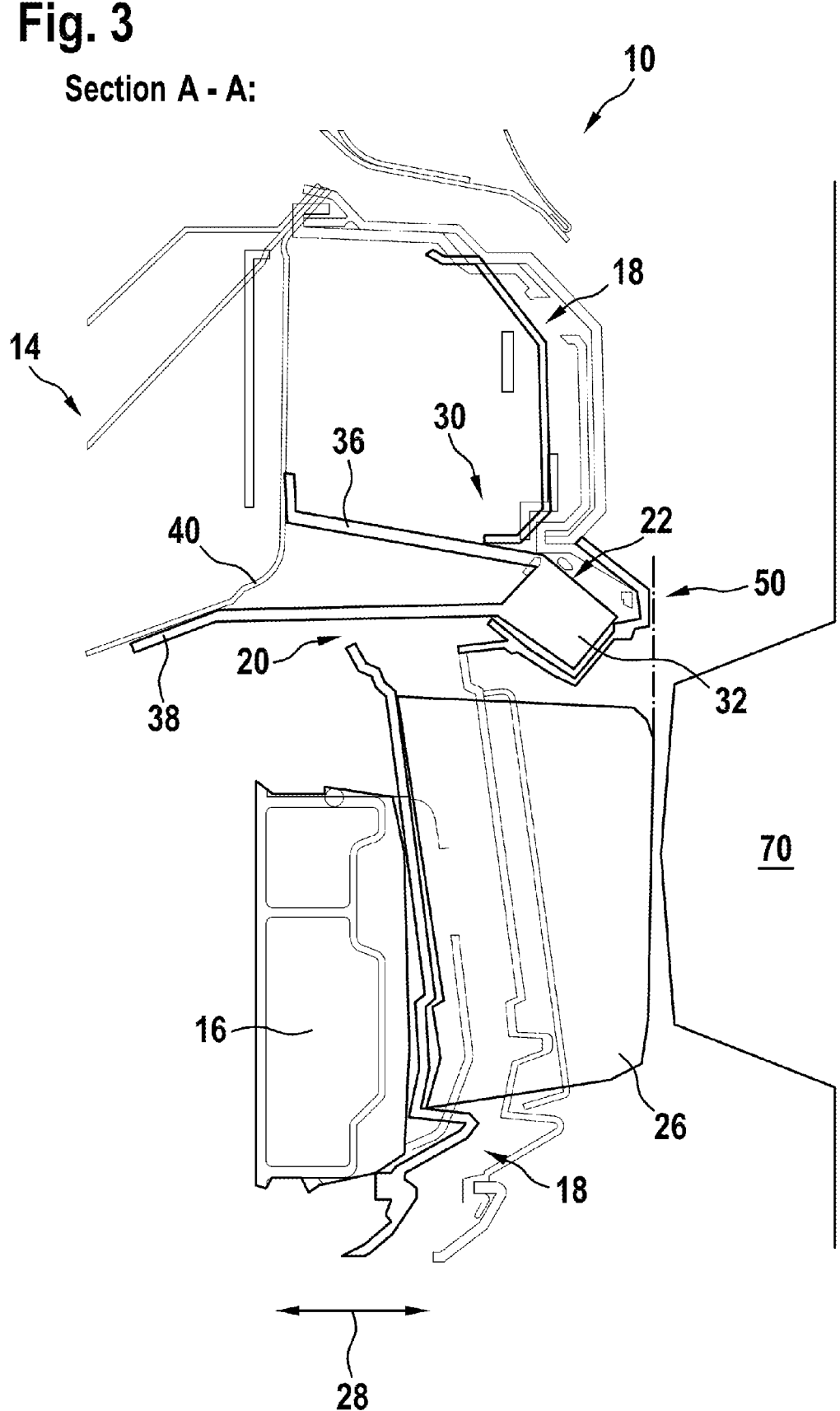
FIG. 3 diagrammatically shows a sectional view (sectional axis A-A in FIG. 1) in a deformed state.

FIG. 3 shows the rear module 10, the bumper 18 and the crossmember 16 having been deformed via one or the two impact elements 24, 26 by way of a collision with an object 70, for example a test pendulum which is provided for this purpose, to be precise along the vehicle longitudinal direction 28 toward the vehicle center.

The position and the orientation of the reversing camera 22 and the covering panel 50 are practically unchanged in relation to the body element 40. The reversing camera 22 in the example is undamaged and intact, with the result that it can continue to be used.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A rear module for a vehicle, comprising:
   a crossmember that extends along a transverse direction and is connected to the vehicle body;
   a bumper connected to the crossmember, the bumper having an aperture;
   a reversing camera that protrudes through the bumper; and
   a first impact element and a second impact element arranged on the bumper to a respective first side and a respective second side of the reversing camera and at a lateral spacing, in the transverse direction, from the reversing camera,
   wherein the first impact element and the second impact element protrude, in the longitudinal direction, beyond the reversing camera and/or the bumper.

2. The rear module as claimed in claim 1, wherein the reversing camera is fastened to the vehicle body by a camera holder independently of the bumper and/or the crossmember.

3. The rear module as claimed in claim 1, wherein the reversing camera is fastened to a further body element which differs from the crossmember and extends along the transverse direction of the vehicle body.

4. The rear module as claimed in claim 1, wherein the reversing camera is covered by a covering panel, the covering panel concealing the aperture configured on the bumper.

5. The rear module as claimed in claim 4, wherein the covering panel is fastened to the reversing camera by way a non-positive and/or positively locking engagement.

6. The rear module as claimed in claim 4, wherein the covering panel protrudes beyond the edge of the aperture but does not engage behind the edge.

7. The rear module as claimed in claim 1, wherein the bumper has a license plate mounting region, and wherein the aperture is configured adjacently with respect to the license plate mounting region.

8. The rear module as claimed in claim 1, wherein the first impact element and the second impact element are arranged at or adjacent with respective first and second lateral ends of the license plate mounting region.

9. A vehicle with a rear module as claimed in claim 1.

10. The rear module as claimed in claim 1, wherein the first impact element and the second impact element protrude, in the longitudinal direction, beyond the reversing camera and the bumper.

11. The rear module as claimed in claim 3, wherein the further body element is positioned above the impact elements in the vertical direction.

12. The rear module as claimed in claim 6, wherein the first impact element and the second impact element protrude, in the longitudinal direction, beyond the covering panel.

13. The rear module as claimed in claim 1, wherein the first impact element and the second impact element comprise an elastic core.

* * * * *